No. 626,572. Patented June 6, 1899.
M. D. SMYSER & G. W. TAYLOR.
CANVAS FASTENER FOR BELT CARRIERS.
(Application filed Feb. 11, 1899.)
(No Model.)
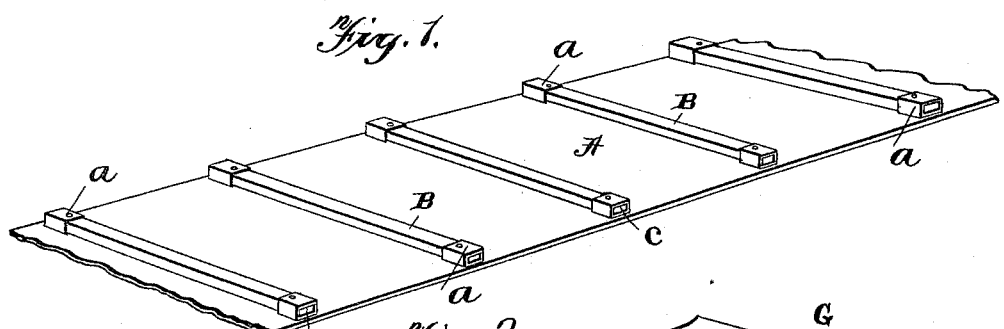
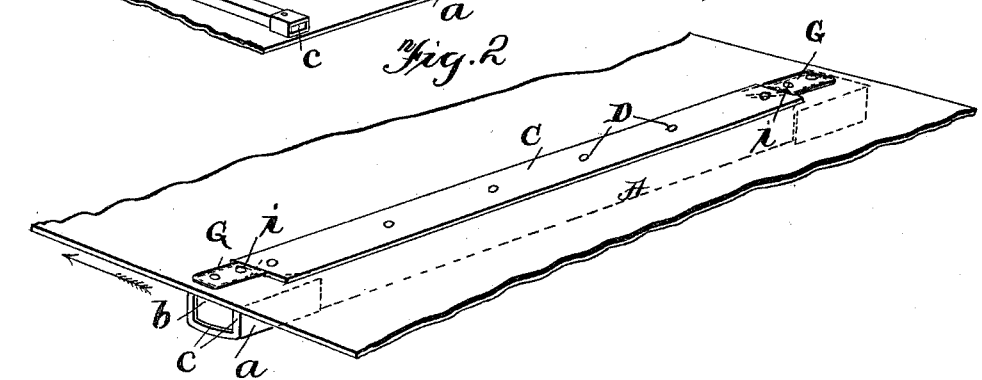
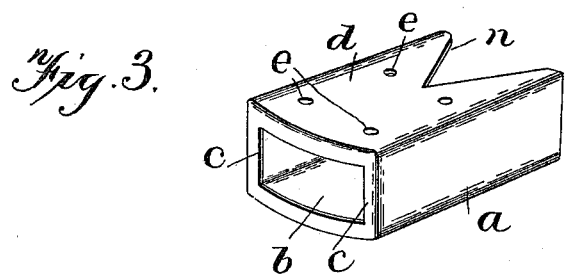
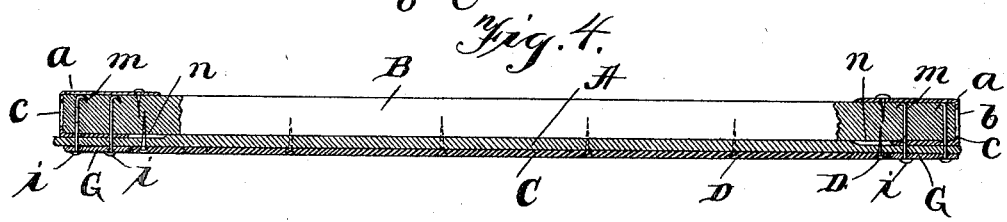
WITNESSES
Geo. E. Drech,
Chas. R. Wright Jr.
INVENTORS,
M. D. Smyser,
G. W. Taylor,
by A. S. Pattison, Attorney.
THE NORRIS PETERS CO., PHOTO-LITHO., WASHINGTON, D. C.

UNITED STATES PATENT OFFICE.

MICHAEL D. SMYSER AND GEORGE W. TAYLOR, OF SPRING FORGE, PENNSYLVANIA.

CANVAS-FASTENER FOR BELT CARRIERS.

SPECIFICATION forming part of Letters Patent No. 626,572, dated June 6, 1899.

Application filed February 11, 1899. Serial No. 705,318. (No model.)

*To all whom it may concern:*

Be it known that we, MICHAEL D. SMYSER and GEORGE W. TAYLOR, citizens of the United States, residing at Spring Forge, in the county of York and State of Pennsylvania, have invented new and useful Improvements in Canvas-Fasteners for Belt Carriers, of which the following is a specification.

Our invention relates to improvements in canvas-fasteners for belt carriers, and pertains to a canvas-fastener specially adapted for traveling belts in mowing and threshing machines, though it is equally adapted for use upon belt carriers in other connections.

The object of our invention is to provide a metallic fastener for attaching the extreme edge of belt carriers to the extremities of the slats which are secured to the belt.

Another object of our invention is to provide a simple reversible metallic clamp for attaching the extreme edge of a traveling belt to the extremities of transverse slats which will prevent the hanging of the grain or straw to the belt, and consequently the carrying away of the belt, and incidentally protect the ends of the slats.

The slats are secured to the belt ordinarily in harvesting and threshing machines by tacking or nailing the belt to the front edge of the under side of the slats, using a strip of leather. In this instance, however, the extreme edge of the belt is not secured to the extremities of the slats, thus leaving a free edge to the belt and leaving a space between the belt and the slats, in which catches the grain or straw, and the grain or straw becoming tangled with the machinery causes a tearing loose of the belt and sometimes the stopping of the machine on that account or else the utter destruction of the belt.

In the accompanying drawings, Figure 1 is a top perspective view of a portion of a belt and a plurality of slats, showing our improved fastener. Fig. 2 is a perspective view of the under side of a portion of the belt, showing our fastening device applied thereto. Fig. 3 is a detached perspective view of the socket forming part of our fastening device, looking at the socket from the under side thereof. Fig. 4 is a longitudinal sectional view through the belt and one of the slats, showing our improved fastening device attached thereto.

Referring now to the drawings, A indicates the belt, and B the slats secured thereto.

C is the usual strip of leather, which is placed outside of the belt and over the slats and attached thereto by nails D.

The above description is the usual way of fastening the belt to the slats, or vice versa, and the edges of the belt are not secured to the extremities of the slats, thus leaving the edges of the belt free and a space therebetween, into which the grain or straw catches and becomes tangled with the machinery, which tears the belt from the slats or the slats from the belt.

Our improved fastening device is intended for attaching the edges of the belt to the extreme ends of the slats, thus doing away with any space between the slats and the overhanging edge of the belt for the grain or straw to catch in.

Our improved device consists of a socket $a$, having an open inner end $b$, which receives the extremities of the slats, the outer ends of the sockets having the surrounding inwardly-projecting flange $c$, against which the end of the slat abuts. The inner wall or face $d$ of the socket is provided with the two sets of nail-holes $e$, the sets being respectively at opposite sides of the center of the socket and adjacent its edges. The object of this construction is to enable the socket to be used at either end of the slat and the belt be attached to the forward edge of the under side of the slat, as illustrated.

In Fig. 2 the direction in which the belt is traveling is indicated by arrow, and it is necessary to prevent the pulling of the slat from the belt that the belt be attached to the forward edge of the under side thereof.

By providing the under face of the socket with two series of holes, one at each side of the center thereof, the sockets will all be manufactured alike, and therefore are reversible, so that they can be applied to each end of the slats, and have holes at the forward edge of the under side to receive the securing-nails.

A plate G, preferably oblong in shape, is provided with holes of a distance apart equal to the distance apart of the holes in the inner wall of the socket and adapted to register therewith, and the securing-nails $i$ are driven through the holes in the plate and the inner wall of the socket and are of a length to have their ends passed through the slats and engage the opposite wall of the socket and be clenched thereby, as shown at $m$. It will also be noted that the outer edge or end of the plate G is flush with the outer end of the slats or sockets, whereby no space is left between the plate and the sockets or slats for the grain or straw to catch.

The inner edge of the under wall of the socket is provided with a V-shaped notch $n$, the object of which is to permit the socket to be driven on the ends of the slats of belts now in use, so that the V-shaped notch will receive the nails D, which pass through the securing-strip of leather C into the slats. This construction enables us to apply the socket to slats which are now in use, and to thus strengthen the slats by preventing the splitting of the slats and also to secure the belt firmly and immovably thereto.

Having thus described our invention, what we claim, and desire to secure by Letters Patent, is—

1. A fastener for securing a slat to a belt comprising a socket embracing the end of a slat and having holes at the edge of the inner wall thereof, a plate engaging the outer side of the belt and having holes registering with the holes in the socket, and securing-nails passing through the holes in the plate, the belt and the holes in the wall of the socket, substantially as described.

2. A device for securing a slat to a belt comprising a socket adapted to embrace the end of the slat, the inner wall of the socket having at its edge nail-holes, a plate having holes registering with the nail-holes and situated outside of the belt, securing members passing through the holes in the plate, the belt and the socket, the outer end of the plate being practically flush with the outer end of the socket, substantially as and for the purpose described.

3. A device for securing a slat to a belt comprising a socket adapted to embrace the end of a slat, the inner wall of the socket having at its edge holes, a plate having holes registering with the holes in the inner wall of the socket, and nails passing through the holes in the plate, the belt and the holes in the socket and of a length adapted to have their inner ends engage the opposite wall of the socket and to be turned laterally for clenching the nails to prevent them from withdrawing, substantially as described.

4. An improved device for securing a slat to a belt comprising a socket adapted to embrace the end of a slat, and having holes for securing members, the inner edge of the inner wall of the socket having a V-shaped notch, substantially as and for the purpose described.

In testimony whereof we have hereunto set our hands in the presence of two subscribing witnesses.

MICHAEL D. SMYSER.
GEORGE W. TAYLOR.

Witnesses:
GEO. F. EYSTER,
J. T. MOYNAHAN.